L. MINTZIES.
CUSPIDOR.
APPLICATION FILED SEPT. 7, 1921.

1,406,472.

Patented Feb. 14, 1922.

INVENTOR
Louis Mintzies
BY his ATTORNEY
Israel Benjamins.

UNITED STATES PATENT OFFICE.

LOUIS MINTZIES, OF BROOKLYN, NEW YORK.

CUSPIDOR.

1,406,472.    Specification of Letters Patent.    Patented Feb. 14, 1922.

Application filed September 7, 1921. Serial No. 498,977.

*To all whom it may concern:*

Be it known that I, LOUIS MINTZIES, a citizen of the United States, residing at 71 New Lotts Road, Brooklyn in the county of Kings and State of New York, have invented a new and useful Cuspidor, of which the following is a specification.

My invention relates to improvements in cuspidors and it consists in the novel features hereinafter more fully described.

The objects of my improvement are:

First: To design a cuspidor from which the contents may be discharged without touching the surface thereof by hand, for sanitary reasons;

Second: To have said cuspidor preferably suspended or supported at some elevation above the floor; and Third: To have said cuspidor simple, durable and inexpensive.

I attain these objects by the cuspidor illustrated in the accompanying drawings or by any mechanical equivalent or obvious modification of the same.

Figure 1:
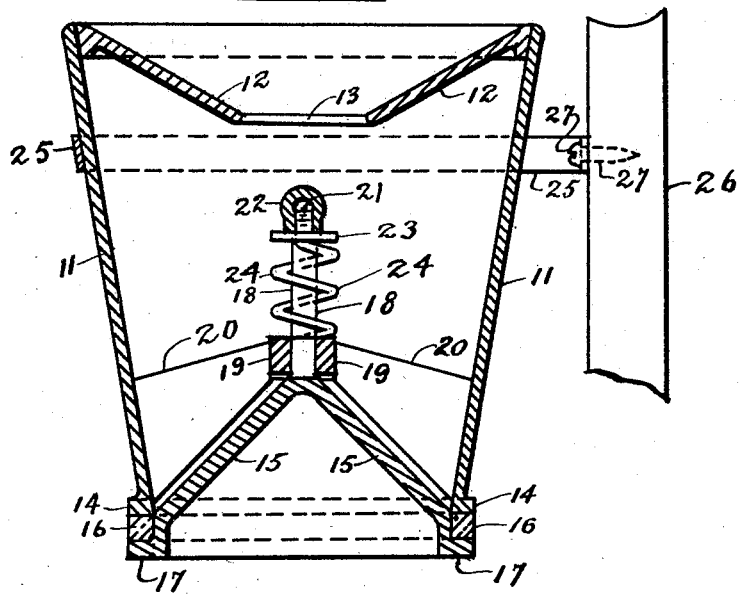
Figure 2:
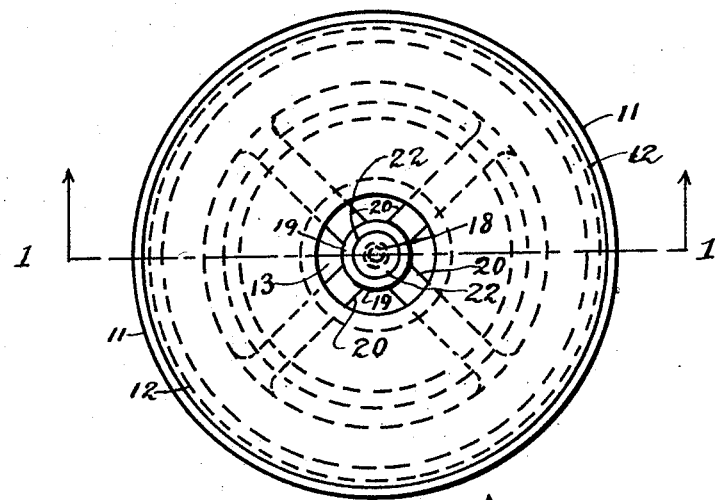

In the drawings Fig. 1 is a vertical section on the line 1—1 of Fig. 2, but showing sundry details in elevation; Fig. 2 is a plan or top view of my cuspidor, omitting the support for the same.

Figure 3:
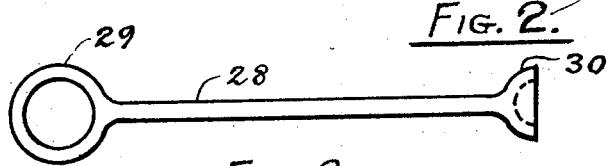

Fig. 3 is a side elevation of the discharge rod hereinafter described.

Similar numerals refer to similar parts throughout the several views:

11 designates the main body of my cuspidor, which body is open at the lower end thereof, which terminates in the outer flange 14, and said main body has at its upper end the cover 12 removably connected thereto.

The cover 12 has provided therein the opening 13.

15 designates the removable bottom of my cuspidor, which bottom terminates at its lower end in the flange 17, which is under and opposite the said flange 14; 16 is a gasket or ring of rubber or some other suitable material interposed between said flanges 14 and 17 to prevent leakage of the contents of the cuspidor therethrough; said gasket 16 may be sprung on to the lower end of said bottom 15 above said flange 17, as shown in Fig. 1, thereby keeping contact therewith when said bottom is separated from said flange 14, as hereinafter described.

At its upper end said bottom 15 terminates in the rod 18, which is shown in Fig. 1 in elevation, and which may be made integrally with said bottom 15, if desired; but it may also be made separate and connected thereto in any suitable manner; said rod 18 passes through the hub 19, which is formed in one with the radial webs 20, which may be made in one with the lower end of the main body 11 of the cuspidor; the rod 18 terminates at its upper end in the screw 21, which is shown as having the washer 23 and the nut 22 connected thereto.

The spring 24, which is shown in Fig. 1 in elevation, is compressed between the hub 19 and the washer 23 under said nut 22, thereby tending to raise the nut 22 with the rod 18 and bottom 15, thereby keeping the flange 17 with the gasket 16 tight against the underside of the flange 14, and thereby preventing leakage of the contents of the cuspidor.

To discharge the contents of the cuspidor, I provide the rod 28, which is shown in Fig. 3 as having at one end thereof the handle 29 and at the other end the socket 30, which may be applied to the nut 22 to move it downwardly against the pressure of the spring 24, thereby moving the bottom 15, with the gasket 16 sprung thereon, downwardly, and thereby separating it from the flange 14 and opening an annular passage for the contents of the cuspidor, which may be normally suspended from a suitable support, such as the strap or bracket 25, which may be connected to the stationary object 26 by means of the screws 27 or in any other suitable way.

The discharged contents of the cuspidor may be gathered into a pail or some other receptacle.

In this way the body or surface of the cuspidor need not be touched by hand while emptying it of its contents, which arrangement is very sanitary.

Many changes could be made in the details of my cuspidor without departing from the main scope of my invention.

I do not therefore restrict myself to the details as shown; but I intend to include also all mechanical equivalents and reasonably obvious modifications of the same within the scope of my invention.

What I claim as my invention, and desire to secure by Letters Patent is:

In a cuspidor a main body open at the lower end thereof, vertical webs converging in a hub at or near the lower end of said main body, said webs with said hub being made in one with said main body, a removable bottom, adapted to close said lower end, said bottom terminating at its upper end in a rod, which is slidably connected to said hub, and a spring on said hub tending to raise said rod, thereby keeping said bottom against said lower end and thereby closing the same.

LOUIS MINTZIES.